G. L. SACKETT.
LIGHTING DEVICE FOR LANTERNS.
No. 10,416. Reissued Dec. 4, 1883.
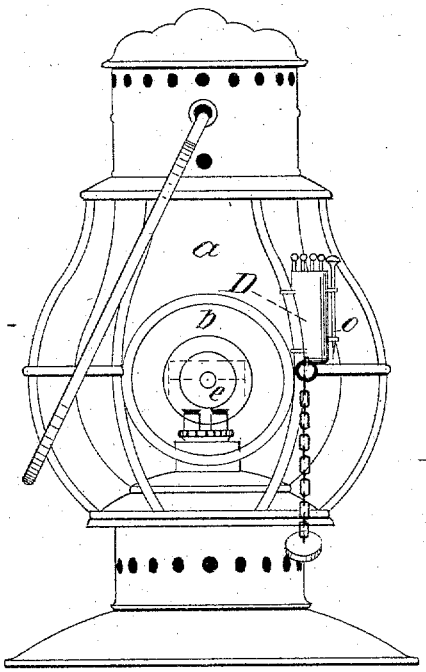
Fig I,
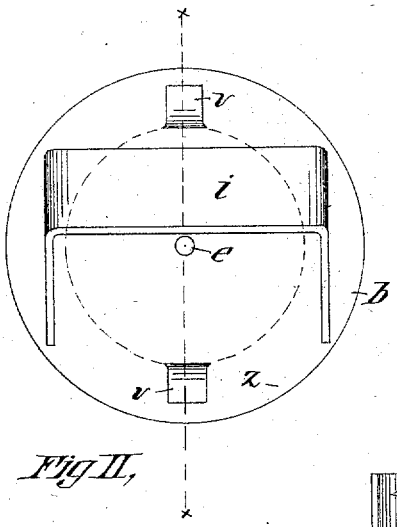
Fig II,
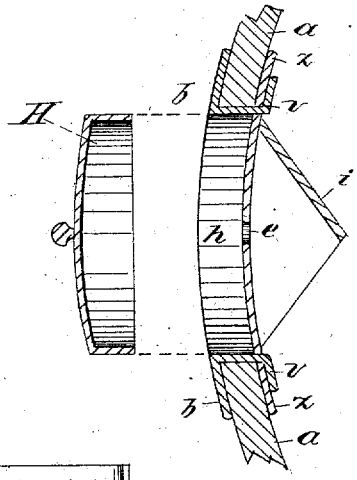
Fig III,
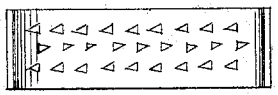
Fig IV,
Witnesses
Wm. H. Chapin
R. F. Hyde
Inventor,
George L. Sackett
by Henry A. Chapin
Atty
N. PETERS. Photo-Lithographer, Washington, D. C.

UNITED STATES PATENT OFFICE.

GEORGE L. SACKETT, OF WEST SPRINGFIELD, MASSACHUSETTS.

LIGHTING DEVICE FOR LANTERNS.

SPECIFICATION forming part of Reissued Letters Patent No. 10,416, dated December 4, 1883.

Original No. 241,428, dated May 10, 1881. Application for reissue filed June 1, 1883.

*To all whom it may concern:*

Be it known that I, GEORGE L. SACKETT, a citizen of the United States, residing at West Springfield, in the county of Hampden and State of Massachusetts, have invented new and useful Improvements in Lighting Devices for Lanterns, of which the following is a specification.

This invention relates to the details of construction of a match-door through the side of a lantern-globe provided with suitable frictional attachments for lighting matches inside of the lantern-globe, and to match-holding devices attached to the lantern within convenient distance of said door, the object being to provide convenient means for lighting, trimming, and generally keeping in proper burning order lanterns while exposed to strong gusts of wind upon railroads, railroad-trains, boats, and other similarly-exposed situations without removing the lamp from the lantern or opening it.

In the drawings forming part of this specification, Figure I is a side elevation of a lantern provided with my improved lighting devices. Fig. II is a rear view of the match-door removed from the lantern-globe. Fig. III is a vertical section of said door and of its cover through line *x x*, Fig. II, and showing portions of the globe of the lantern on the upper and lower sides thereof. Fig. IV is a plan view of the face of the match-lighter next to the face of said door, which is inside of the lantern-globe.

In the drawings, *a* is the globe of the lantern. *b* is the match-door. *e* is a central aperture through door *b*. *i* is the match-lighter. *v* are locking-lips on the outer portion of said door, and *z* is the inner plate thereof, secured inside of globe *a*. D is a match-box secured to the lantern-frame adjacent to door *b*, and *o* is a lamp-pick hung on box D. H is a cover to door *b*.

I construct the match-door *b* of suitable sheet metal, sinking its central portion to form a proper cavity to hold the cover H, and around said sunken portion projects a flange, as shown. Said sunken portion of the door is provided with locking-lips *v*, as shown. The inner plate of door *b* consists of a disk or plate, *z*, of about the same diameter as said outer portion of the door, and has a central aperture, *e*, therein, and is perforated to allow the lips *v* to pass through it.

Upon the inner face of plate *z* within the lantern, in the position shown, is fixed the match-lighter *i*, the surface of which, next to said disk, is roughened, as seen in Fig. IV.

To attach my match-door to glass lanterns, I make a round opening in the side of the globe thereof of suitable dimensions to receive the sunken part *h* of door *b*, place the plate *z* against the inner face of the glass with the lips *v* projecting through it, and bend up and down said lips, as in Fig. II.

The door *b* is located at such a height in the lantern-globe as will bring the aperture *e* therein a little above the wicks of the lamp.

The cover H to door *b* is suspended by a chain to the frame of the lantern, and is of cup shape, and is adapted to fit closely into the sunken portion of the door.

The match-box D is attached, as seen, to the lantern-frame, and may be provided with a suitable cover.

The operation of lighting and trimming a lantern by the use of my improvements, and without opening it or taking out the lamp, is as follows: The cover H is removed from the door *b*, a match is inserted through the aperture *e* therein, and by properly rubbing it against the under roughened face of the match-lighter *i* it becomes ignited, and may then be applied to the wicks of the lamp to light it. If the wicks of the lamp need adjusting, the lamp-pick *o* may be inserted through the aperture *e* for that purpose.

The use of the within-described match-door is not necessarily confined to globe-lanterns, but may be used with advantage upon almost all descriptions thereof.

Lanterns provided with my within-described lighting and trimming devices possess peculiar advantages for use upon railroads and railroad-trains, for howsoever strongly the wind may blow or the air be disturbed by the motion of the train the lantern can be surely lighted and cared for without the least danger of losing the light thereby, for the match is always ignited within the lantern, where it is perfectly protected from the wind and storm; and, furthermore, when a railroad employé is left for hours upon the track, as is frequently the case, to signal an approaching train he often finds it necessary to retrim his low-burning lamp; but if he must remove the lamp from the lantern to do it he runs the risk of losing his light entirely, whereas if his lantern is provided with my improvements no such risk is incurred.

The glass of the lantern herein shown is protected from being broken by the usual guard-wires secured to its frame above and below, of which the ring surrounding the door *b*, Fig. I, is a part.

What I claim as my invention is—

1. In combination with a lantern-globe, the match-door *b*, consisting of the sunken part *h* and the plate *z*, having the central aperture, *e*, therein, and the match-lighter *i*, secured to the said plate *z*, substantially as and for the purpose set forth.

2. A lantern having an unobstructed perforation through the glass globe thereof nearly opposite the wick-tubes of the lantern-lamp, a door, substantially as described, to close said perforation, and a frictional attachment arranged between the opening and the wick-tubes, substantially as described, secured within said glass at one side of said perforation.

3. A lantern having an unobstructed perforation through the glass globe thereof nearly opposite the wick-tubes therein, attached substantially as described, secured within said glass near said perforation, and carrying a frictional plate set at one side of said opening, all as set forth.

GEORGE L. SACKETT.

Witnesses:
H. A. CHAPIN,
R. F. HYDE.